Sept. 21, 1926.  W. E. MARSH  1,600,769

FASTENER

Filed June 11, 1925

INVENTOR.
Willard E. Marsh.
by J. H. Weatherford
ATTORNEY.

Patented Sept. 21, 1926.

1,600,769

UNITED STATES PATENT OFFICE.

WILLARD E. MARSH, OF MEMPHIS, TENNESSEE.

FASTENER.

Application filed June 11, 1925. Serial No. 36,341.

This invention relates to fastening, connecting, securing, or attaching, devices in general, but more particularly to a fastener which is especially adapted for detachably securing together separate pieces of the same or different flexible material or materials, for similarly attaching one or more pieces of flexible material to a rigid or semi-rigid member or members, or for separably connecting two or more rigid or semi-rigid members.

As an example of the application of my invention to commercial use, I have illustrated in the accompanying drawings, and shall describe hereinafter, a form of my improved fastener which I prefer to employ for detachably securing flexible material, such, for instance, as that of which vehicle curtains ordinarily are made, to a rigid or semi-rigid structure, such as a part of a vehicle body or its top framing. It is to be understood, however, that such illustration and description are intended to be merely typical, and that my invention is in no wise limited to this or any other specific use.

The principal objects of the present invention are to provide a fastening device of the character described, which shall be simple, compact, strong and durable; which shall be adapted to receive a button or other form of clasp member, or the head of a screw or nail, or other such part intended to cooperate with the fastener, and to secure such part firmly against accidental or otherwise unintended displacement; and in which slight movement of such cooperating part, or of the fastener relative thereto, shall be sufficient to lock such part in place, or to detach it in the intended manner.

The means by which the foregoing and other objects are accomplished by my invention, and the manner of their accomplishment, readily will be understood from the following description on reference to the accompanying drawings, in which,—

Figure 1:
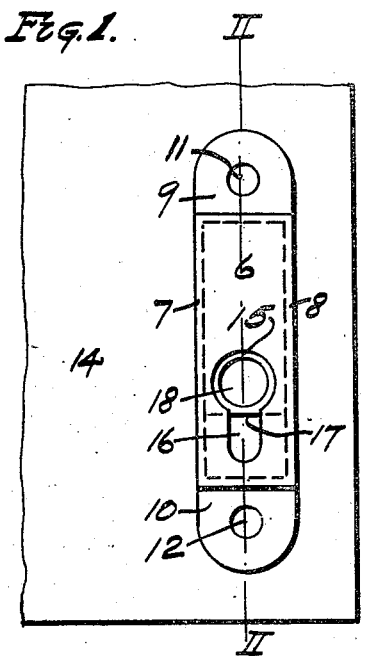
Fig. 1 is a front elevation of a preferred form of my improved fastener, showing a portion of the curtain or other member to which it is attached.

As shown in the drawings, the fastener comprises a base plate 5, and a top therefor having a plane portion 6 which is parallel with and spaced a predetermined distance away from said plate, and has its sides 7 and 8 bent substantially at right angles toward said plate and into contact therewith, and its ends 9 and 10 similarly bent toward and into contact with plate 5, and then extended upon the plate substantially to the respective ends thereof. Registering holes 11 and 12 are formed near the respective ends of the base plate and the top of the fastener, to provide for the insertion therein of rivets 13, or other suitable connecting means, which serve the double purpose of securing the plate 5 and the top together, and of attaching the fastener to a curtain 14, or the like. Near one end of the plane portion 6 of the top of the fastener, on the longitudinal center line thereof, a circular opening 15 is formed therein, and a slot 16, the width of which is less than the diameter of said opening, extends centrally therefrom toward the end 10 of the top and preferably terminates in a semi-circle.

A slide 17 is movable longitudinally in the space defined by the plate 5 and the portions 6, 7 and 8 of the top of the fastener, said slide having a circular opening 18 extending therethrough, on its longitudinal center line, and near the end which is toward end 10 of the top of the fastener, the diameter of opening 18 preferably being slightly less than that of opening 15 in said top. In the bottom of the slide 17, on the longitudinal center line thereof, two similar holes 19 and 20 are formed therein, said holes being so shaped and dimensioned as to adapt them to receive a projection 21 extending from the plate 5, on the longitudinal center line thereof, toward the slide 17. The location and spacing of the holes 18, 19 and 20 in the slide 17, those of the hole 15 and of the center of the semi-circular end of the slot 16 in the top of the fastener, and the position of the projection 21 on plate 5, are such that when opening 18 in the slide substantially registers with hole 15 in the top, the projection or detent 21 is entered in hole 20 at the bottom of the slide, and the upper end of the slide abuts against end 9 of the top of the fastener; also, when the center of the semi-circular end of slot 16 in the top is substantially over the center of opening 18 in the slide, the detent 21 is entered in hole 19 at the bottom of the slide, and the lower end of the slide abuts against the end 10 of the top of the fastener. The base plate 5 is made of spring steel, brass or other resilient material, and normally is flat, so that when one or both of the ends of said plate is or are secured to the end or ends of the top of the fastener, as by the rivets 13, the slide 17 is held in contact with the plane portion 6 of the top, and the detent 21 is urged yieldingly toward the bottom of the slide.

Figure 2:
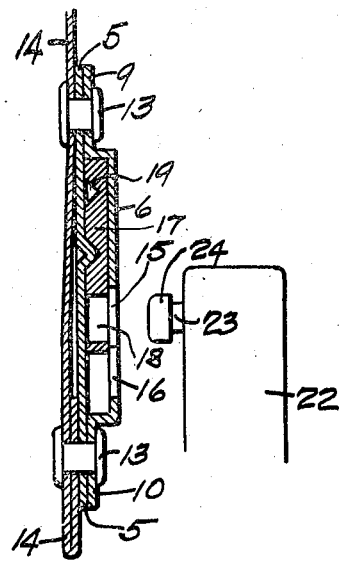
Fig. 2 is a sectional elevation, taken substantially on line II—II of Fig. 1, and showing a button adapted to cooperate with the fastener, and a portion of the member upon which said button is mounted.
Figure 3:
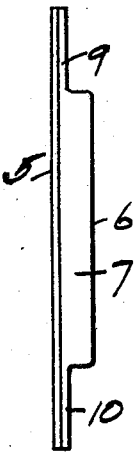
Fig. 3 is a side elevation of the fastener, from which there is omitted the rivets or other means for securing the parts of the fastener together.
Figure 4:
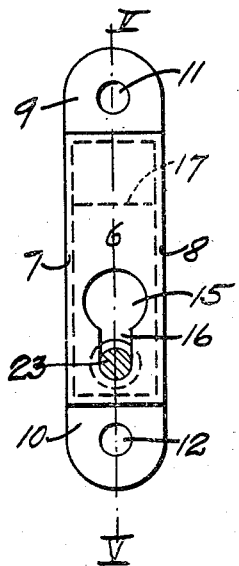
Fig. 4 is a front elevation of the same, showing the slide in locking position, and the shank of the button in section.
Figure 5:
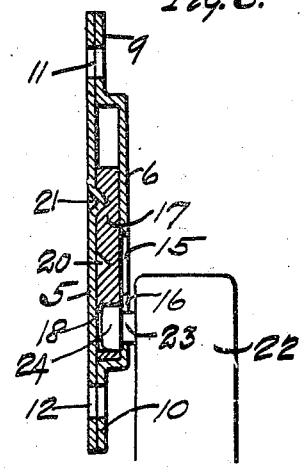
Fig. 5 is a sectional elevation, taken substantially on line V—V of Fig. 4, showing the cooperating button in locked position, and the support therefor.

To illustrate the use of my improved fastener, I will assume that it is secured near the corner, or other portion of the edge of a vehicle curtain 14, which it is desired to attach to a part 22 of the body or top of a vehicle, such part being provided with a stud, or other similar member, having a shank 23, and a head 24 of greater diameter than said shank. The slide 17 initially is in the position shown in Figs. 1 and 2, with opening 18 in the slide in register with opening 15 in the plane portion 6 of the top of the fastener. The head 24 of the stud is first entered in the openings 15 and 18 until the base of the head is slightly beyond the inner surface of the portion 6 of the top, whereupon the fastener, and the portion of the curtain to which it is attached, are moved on the longitudinal center line of the fastener until the slide is in the position shown in Figs. 4 and 5. The shank 23 of the stud will now be at the end of slot 16, the head of the stud will be in opening 18 in the slide and between plate 5 and plane portion 6 of the top, and the detent 21 will be entered in hole 19 in the bottom of the slide. To detach the stud from the fastener the foregoing operation is reversed, the relative positions of the parts being changed from those shown in Figs. 4 and 5 to those shown in Figs. 1 and 2. Manifestly, the force required to overcome the tendency of the detent 21 to hold the slide 17 against movement when said detent is entered in one of the holes 19 or 20 in the bottom of the slide, will depend both upon the configuration and dimensions of the detent 21 and the holes 19 and 20, and upon the stiffness of the resilient plate 5, and thus the holding power of the fastener may be varied according to the use to which it is intended to be put.

Various modifications of minor details of my improved fastener will doubtless readily suggest themselves to those skilled in the art to which it appertains, and I therefore do not desire to limit my invention to the exact forms of construction shown and described. For example, the form of the top of the fastener, or the arrangement of the holes therein, may be changed; or the shape of the slide, or the arrangement of the hole 18 therein, may be varied; or some other type of detent members may be employed; or the resilient member 5 may be of a different form, or connected with the top of the fastener in a different way,—without departing from the intended scope of my invention.

Having thus described the invention, what I claim is:—

1. A fastener comprising a top, a resilient member secured to said top, a slide interposed between and movable relative to said top and said resilient member, an opening in said top, an opening in said slide, and means rendered effective by said resilient member, tending to retain said slide in a position for predetermined cooperation between said two openings.

2. A fastener comprising a top, a resilient member secured to said top, a slide interposed between and movable relative to said top and said resilient member, an opening in said top, a slot extending from said opening, an opening in said slide, and means rendered effective by said resilient member, tending to retain said slide selectively in a plurality of positions for predetermined cooperation between the opening and slot in said top and the opening in said slide.

3. A fastener comprising a top or body portion forming a guideway for a slidable longitudinally member of said top, a resilient member at one side of said slidable member, tending to urge it toward the outer face of said body portion, and a detent rendered effective by said resilient member, for retaining said slidable member yieldingly in a predetermined position.

4. A fastener comprising a top or body portion forming a guideway for a slidable member, a resilient member at one side of said slidable member tending to urge it toward said body portion, and a detent rendered effective by said resilient member, for yieldingly retaining said slidable member selectively in a plurality of predetermined positions.

5. In a device for fastening parts together, the combination of a fastening member carried by one of said parts, and a co-operating member carried by another one thereof, said fastening member comprising a casing, and a slide movable longitudinally within said casing, said slide having an opening therein, in position for engagement by said co-operating member to move said slide by movement of one of said members longitudinally of, and substantially parallel with, the other one thereof, thereby securing said co-operating member to said fastening member.

6. In a device for fastening parts together, the combination of a fastening member carried by one of said parts, and a co-operating member carried by another one thereof, said fastening member comprising a casing, a slide reciprocable within said casing, said slide having an opening therein, in position for engagement by said co-operating member to move said slide by movement of one of said members longitudinally of, and substantially parallel with, the other one thereof, thereby securing said co-operating member to said fastening member, and means for yieldingly retaining said slide in such position.

7. In a device for fastening parts together, the combination of a fastening member carried by one of said parts, and a co-operating member carried by another one thereof, said fastening member comprising a casing, a slide reciprocable within said casing, and an opening in said casing to afford access by said co-operating member to said slide, said slide having an opening therein, in position for engagement by said co-operating member to move said slide by movement of one of said members longitudinally of, and substantially parallel with, the other one thereof, thereby securing said co-operating member to said fastening member.

8. In a device for fastening parts together, the combination of a fastening member carried by one of said parts, and a co-operating member carried by another one thereof, said fastening member comprising a casing, and a slide reciprocable within said casing, said slide having an opening therein in position for engagement by said co-operating member to move said slide by movement of one of said members longitudinally of, and substantially parallel with, the other one thereof, thereby securing said co-operating member to said fastening member.

9. In a device for fastening parts together, the combination of a fastening member carried by one of said parts, and a co-operating member carried by another one thereof, said fastening member comprising a casing, a slide within said casing, said slide having an opening therein, in position for engagement by said co-operating member to move said slide by movement of one of said members longitudinally of, and substantially parallel with, the other one thereof to secure said co-operating member to said fastening member, and resilient means between said casing and the part by which said fastening member is carried, said resilient means having means forming part thereof for retaining said slide yieldingly in a predetermined position, and thereby maintaining the connection between said co-operating member and said fastening member.

In testimony whereof, I affix my signature.

WILLARD E. MARSH.